INVENTORS.
FREDERICK O. LUENBERGER
CHARLES J. TUCKER
By Flam and Flam
ATTORNEYS.

United States Patent Office 3,441,762
Patented Apr. 29, 1969

3,441,762
DEMOUNTABLE VERTICAL PUMP MOTOR WITH REDUCER GEAR, HEAT EXCHANGER, AND LUBRICATION SYSTEM
Frederick O. Luenberger, Los Angeles, and Charles J. Tucker, Santa Ana, Calif., assignors to Emerson Electric Co., St. Louis, Mo., a corporation of Missouri
Filed Mar. 31, 1966, Ser. No. 539,217
Int. Cl. H02k 7/116
U.S. Cl. 310—157
41 Claims

ABSTRACT OF THE DISCLOSURE

A combined motor and gear reduction mechanism is provided for low speed operation of a pump shaft. A hollow low speed driven shaft is supported by the casing and telescopes over the upper end of the pump shaft. An adjustment nut carried on the top of the pump shaft rests directly or indirectly on the hollow shaft. A high speed driving shaft is supported in spaced parallel relationship to the driven shaft. Gears connect the shafts. A high speed motor is detachably mounted on the casing directly to connect with the high speed shaft.

Brief summary of the invention

This invention relatess to electrical motors, and particularly to vertical motors for operating underground pumps in wells.

When the underground pump is designed to operate at relatively high speeds, a four-pole motor may be directly connected to the pump shaft as shown or indicated, for example, in prior U.S. Letters Patent Nos. 2,568,861, issued Sept. 25, 1951; 2,902,323, issued Sept. 1, 1959; and 3,017,526, issued Jan. 16, 1962. If, however, the pump is designed to operate at low speeds, it has been common to use motors having increased numbers of pole pairs. An efficient motor of this character, although easily maintained, is quite large, heavy and costly. In general, high-speed motors together with gear reduction mechanisms have not been used because providing two units instead of one results in no significant savings. Accordingly, the primary object of this invention is to provide a combined motor and gear reduction mechanism in a single package and designed as a unit for economical manufacture, installation and maintenance.

Another object of this invention is to provide only three bearings for the motor shaft and pinion gear to hold these parts in precise alignment and to sustain the thrust of the rotor and pinion gear. A companion object is to provide a structure of this character in which the rotor can be removed without disturbing the pinion gear and two of the bearings that support the pinion, all without requiring any elaborate coupling device. In order to accomplish this purpose, the rotor shaft is provided with a locking taper between the lower end of the rotor shaft and the upper end of the pinion shaft, together with a simple jack nut. Concentricity is ensured by virtue of the tapered connection of the parts, and additional bearings and connector devices for accommodating misalignments are not required.

Another object of this invention is to provide a power unit of this character capable of reliable starting and operation even though the unit may stand idle for a substantial period of time. For this purpose, we provide a novel forced lubrication system for all the bearings and gears except the upper bearing for the motor, which is a self-contained sealed unit. By novel means, lubricant is made available at starting for use by the high-speed intermediate bearing which is normally above the lubricant level.

Another object of this invention is to provide a unit of this character in which all of the high-speed bearings may be removed through the stator bore, all without disturbing the level adjustment between the drive shaft and the pump shaft.

Another object of this invention is to provide a lubricant pump that derives power from the rotary apparatus so located and connected that it may be easily removed and replaced without disturbing the other mechanisms.

Another object of this invention is to provide an enclosed heat exchanger for the circulating lubricant located so as to be served by the same fan that cools the lower end of the motor. A companion object of this invention is to provide an arrangement whereby the heat exchanger and the motor, although supplied by the same fan, nevertheless have separate cooling air whereby both are efficiently cooled.

Another object of this invention is to provide improved means for connecting the unit to the pump shaft whereby a disconnect is automatically effected should there be any upthrust on the pump shaft.

This invention possesses many other advantages and has other objects which may be made more clearly apparent from a consideration of one embodiment of the invention. For this purpose, there is shown a form in the drawings accompanying and forming a part of the present specification, and which drawings, unless described as diagrammatic, or unless as otherwise indicated, are true scale. This form will now be described in detail, illustrating the general principles of the invention; but it is to be understood that this detailed description is not to be taken in a limiting sense, since the scope of this invention is best defined by the appended claims.

Detailed description

Figure 1:
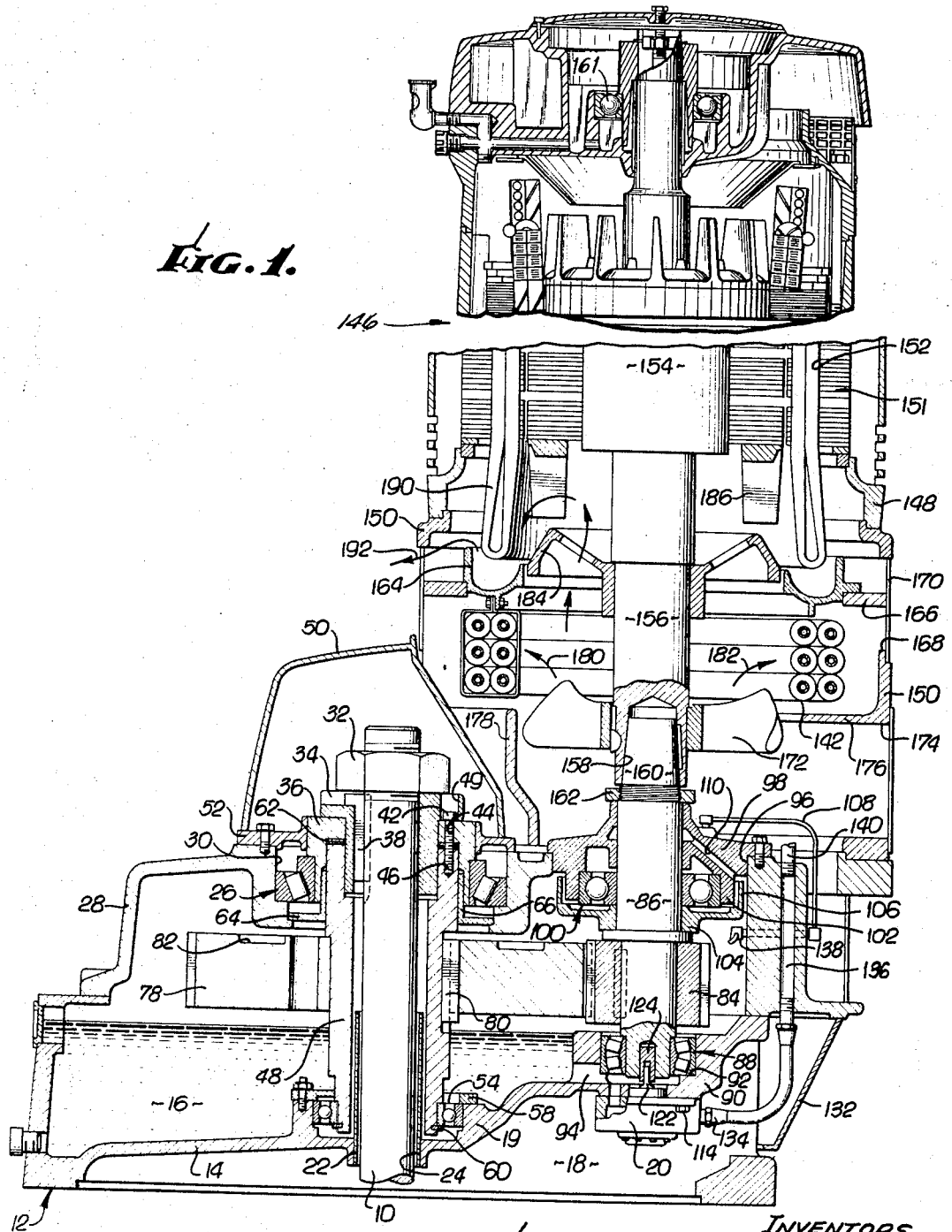
FIGURE 1 is a two-part axial sectional view of a motor gear unit incorporating the present invention, a fragment corresponding to the central portion of the drive motor being removed, and the upper part having a scale slightly reduced as compared to that of the lower part.

The apparatus shown in the drawings is intended to drive a pump shaft 10. The pump shaft 10 projects upwardly through a casing part 12 attached at the head of the pump. The casing part 12 has an offset wall 14 that defines on its upper side a reservoir 16 for a lubricant. Beneath the wall 14 is a space 18 for accommodating a lubricant pump 20 to be hereinafter described.

The shaft 10 projects upwardly through a bearing cup 19 formed on the partition wall 14 and through an upstanding oil retainer sleeve 22 fitted to the aperture 24 of the cup 19.

The pump shaft 10 is supported by a large thrust bearing 26. The bearing 26 is accommodated in a cup 30 formed on one side of a companion casing part 28 that overlies the casing part 12.

Figure 2:
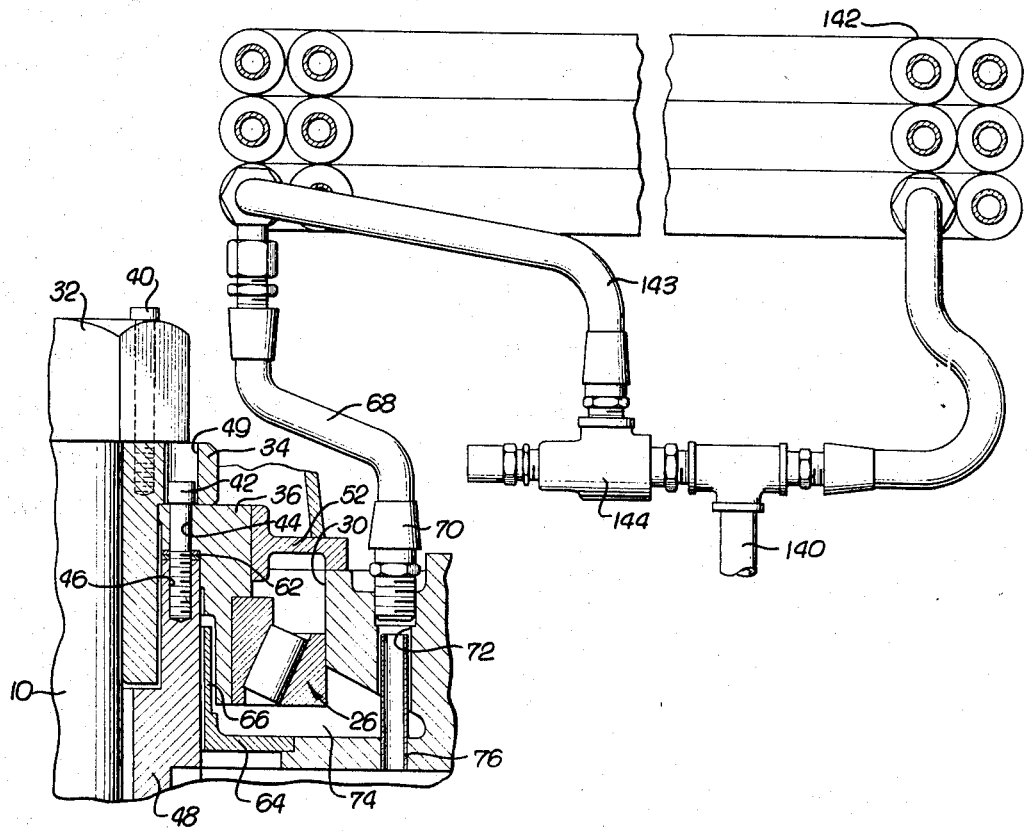
FIG. 2 is a diagrammatic view showing the oil circulation system together with an enlarged fragmentary sectional view of a portion of the apparatus shown in FIG. 1.

Adjustably mounted upon the threaded upper end of the pump shaft 10 is a nut 32, which rests upon an upper coupling member 34. The upper coupling member 34 in turn rests upon a lower coupling member 36 that is supported by the inner race of the bearing 26. The upper coupling member 34 is connected to the pump shaft 10 by the aid of a key 38 and a locking screw 40 (FIG. 2). Coupling members 34 and 36 are releasably connected together by a series of screws 42 located equiangularly about the axis of the pump shaft 10. The screws pass through apertures 44 in the lower coupling member 36 and threadedly engage tapped holes 46 in the upper end of a hollow shaft 48 to be described hereinafter. The cylindrical heads of the screws 42 project into the lower ends of apertures 49 of the upper coupling member 34. Torque, applied to the lower coupling member 36 by the aid of the hollow shaft 48, is transmitted to the upper coupling member 34 through the heads of the screws 42. Should there be any upthrust on the pump shaft 10, the upper coupling member 34 will disengage as the heads 42 clear the lower ends of the apertures 49.

In order accurately to adjust the position of the pump runners, the shaft 10 is raised or lowered by turning the nut 32. After the nut is in proper position, the locking screw 40 is attached at one of a number of apertures in the nut. The nut 32 is accessible by removing a small cap 50. The cap normally overlies a cover plate 52 that closes the bearing cup 30.

The hollow shaft 48 projects downwardly beneath the bearing recess 30 with its lower end supported by a bearing 54 accommodated in the cup 19 of the lower casing part 12. A bearing retainer 58 not only limits upward movement of the bearing 54 but also limits upward movement of the hollow shaft 48. For this purpose, the hollow shaft 48 carries a snap ring 60 that engages beneath the inner race of the bearing 54. The upper bearing 26, by engagement with the lower coupling member 36, limits downward movement of the shaft. Shims 62, accommodated between the lower coupling member 36 and the upper end of the shaft 48, justify tolerances to eliminate play.

The lower bearing 54 is at all times submerged beneath the level of lubricant 16; and since it is a low-speed bearing, the churning effect is minimal. The thrust bearing 26 lies above the level of lubricant 16 and is supplied with lubriant by the pump 20 by means hereinafter to be described. An oil retainer 64 fitted in the bottom of the cup 30 determines a level of lubricant for the bearing 26 so that it is normally submerged. The retainer 64 has a central flange 66 that extends upwardly between the lower coupling member 36 and the shaft 48.

Lubricant is conducted to the space by the aid of a conduit 68 (FIG. 2) that, by the aid of a fitting 70, connects to the upper end of a bore 72 that extends through the bearing cup 30 on one side of its bearing. A cavity 74 intersects the bore 72 and connects it to the bearing recess. Extending upwardly from the bottom of the bore is a short tube 76 that has clearance with the upper portion of the bore 72. Some of the lubricant thus splashes or spills over the upper edge of the tube 76, and the remainder passes through the tube 76 back to the reservoir 16. The upper edge of the tube 76 thus determines the normal lubricant level.

The hollow shaft 48 is rotated by a spur gear 78 (FIG. 1) that is connected thereto as by a key 80. The gear 78 has an annular recess 82 in its upper surface located substantially in alignment with the tube 76. When the apparatus comes to rest, a certain amount of lubricant will be trapped. When the apparatus starts, the trapped lubricant will run out to the teeth of the gear 78.

The gear 78 is rotated by a pinion 84 supported on a shaft section 86. The lower end of the shaft section is supported by a bearing structure 88 accommodated in a bearing cup 90 of the casing partition 14. The level of lubricant 16 is above the level of the bearing 88, and communication between the bottom of the recess 92 for the bearing 88 and the reservoir 16 is provided by a port 94. The upper end of the shaft 86 projects through an aperture 96 located in the casing part 28 laterally of the bearing cup 30. The shaft section 86, together with the pinion 84 and the bearing structure 88, can be lifted upwardly through this aperture 96. A bearing bracket 98 detachably secured about the aperture 96 serves to support the outer race of an intermediate bearing 100 that is located above the pinion 84. The bearings 100 and 88, located close to opposite sides of the pinion 84, precisely determine the axis of the pinion for proper operation.

The bracket 98 has a depending flange 102 in which the bearing 100 is accommodated. The inner race of the bearing 100 is mounted directly upon the shaft section 86. Immediately beneath the bearing bracket is a slinger 104 attached to the shaft section 86 and having a flange 106 that surrounds the depending flange 102 of the bracket 98. The upper edge of the flange 106 determines a static level of lubricant for the bearing structure 100. However, when the shaft 86 is rotated, centrifugal action slings lubricant from the bearing 100 so that it operates efficiently at high speed without churning lubricant.

Lubricant is supplied to the space defined by the slinger 104 by the aid of a conduit 108 that connects with the bearing bracket 98 and communicates with the cup by the aid of an oblique port 110. When the apparatus comes to rest, centrifugal action of the slinger 104 reduces, and a quantity of lubricant is trapped for use by the bearing upon starting. The bearing is proposely attached directly to the shaft section 86 in order to minimize its required diameter. No sleeve retainer is required in order effectively to trap lubricant for the bearing.

Figure 3:
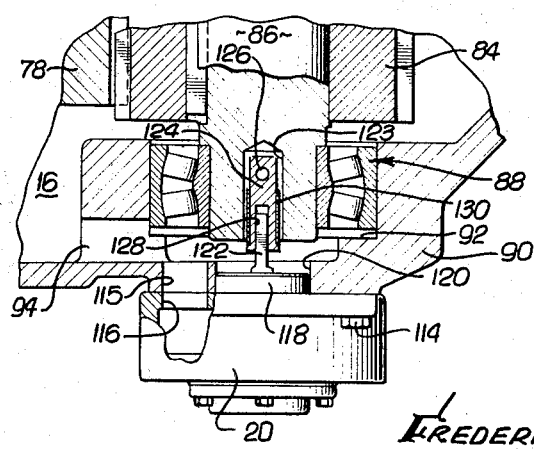
FIG. 3 is an enlarged fragmentary sectional view showing the thrust bearing for the high-speed motor and pinion shaft.

The pump 20 provides a flow of lubricant both to the conduit 108 and the conduit 68 (FIG. 2). The pump 20, as shown in FIG. 3, is attached beneath the casing partition 14 in alignment with the shaft section 86. Bolts 114 are provided for this purpose. Lubricant from the reservoir 16 communicates with the interior of the pump casing by the aid of registering apertures 115 and 116. The pump 20 has a bearing boss 118 that fits an aperture 120 immediately beneath the bearing 88. The shaft 122 of the pump projects upwardly for connection to the lower end of the shaft section 86. The shaft section 86 has a downwardly opening cylindrical recess 123. A connector 124 is pivotally mounted in the recess 122 by the aid of a cross pin 126 that allows the connector 124 to swivel about a transverse axis. The lower end of the connector 124 is provided with a cross slot 128 that slidably receives a correspondingly shaped flattened end of the shaft 122. A retainer sleeve 130 confines the flattened shaft 122 in position. By virtue of the swivel mounting of the connector 124 and the cross slot 128, slight misalignments between the pump 20 and the shaft sectcion 86 are tolerated. The pump 20 may be removed for repair or replacement through a cover 132 (FIG. 1) detachably secured at the side of the casing 12.

The pump 20, as shown in FIG. 1, has an outlet fitting 134 that connects to a bore 136. The bore 136 extends vertically through the outer wall of the casing 28. Branch fittings establish connection to the conduit 108 and to a nozzle 138 positioned to spray lubricant on the pinion 84. The upper end of the bore 136 connects with a conduit 140 (FIG. 2) and to one end of a cooling coil 142. The other end of the cooling coil 142 connects with the conduit 68 for supplying lubricant to the large thrust bearing 26. A bypass conduit 143, controlled by a pressure relief valve 144, discharges lubricant back to the reservoir 16.

In order to drive the shaft section 86, a relatively high-speed motor 146, such as conventionally used for high-speed pump applications, is provided. The motor 146 has a frame 148 supported on an adapter 150 which in turn is supported upon the casing part 28 laterally of the pump shaft 10. The frame 148 mounts the stator structure 151. The stator bore 152 is held in axial alignment with the axis of the bearings 88 and 100 by the aid of suitable registers between the frame 148, the adapter 150 and the casing 28.

The rotor structure 154 has a downwardly extending shaft 156, the lower end of which is provided with a tapered socket 158 that wedgingly engages a correspondingly tapered projection 160 at the upper end of the shaft section 86. When the shaft sections 156 and 86 are driven together, the wedging parts 158 and 160 determine precise concentricity. The upper end of the rotor 154 is supported by the aid of a bearing 161 which in turn is provided with a self-contained lubricant system. In order to separate the shaft sections 156 and 86, a jack nut 162 is provided that is threadedly mounted upon the shaft section 86 between the tapered extension 160 and the bracket 98. By rotating the jack nut 162, the lower edge of the shaft section 156 is engaged and caused to separate. When the shaft sections 156 and 86 are to be placed in engagement, the jack screw 162 of course is lowered.

The heat exchange coil 142 is suspended in the upper portion of the adapter 150 by the aid of a bracket 164. This bracket 164 rests upon the edge of an apertured wall 166 of the adapter. The upper end of the adapter has peripheral openings 168 extending both above and below the wall, and covered by a suitable screen 170. Air is caused to pass radially through the cooling coils 142 by the aid of a fan 172 attached to the lower portion of the rotor shaft 156. This fan 172 has a diameter less than the internal diameter of the coil 142 so that it may be lifted with the rotor and shaft section through the coil 142. The inlet to the fan is provided through an opening 174 in the lower portion of the adapter 150. The adapter is provided with suitable wall means, as at 176 and 178, in order to conduct the inlet air to the fan 172. A portion of the air passes, as indicated by the arrows 180 and 182, through the coils for cooling purposes and outwardly through the lower portion of the opening 168. A portion of the air, however, passes upwardly through the coils and past a baffle ring 184 to the inner portion of a fan 186 mounted or cast integrally with the lower end of the rotor structure. The air is then forced about the motor windings 190 and thence through the upper part of the opening 168, as indicataed by the arrows 192. The coil suspension bracket 164 is formed to provide a suitable duct for guiding air past the windings 190. The baffle ring 184 runs close to the central aperture of the coil suspension bracket 164 in order to conduct air to the rotor fan 186. The central part of the baffle ring 184 is ported while the outer part is not.

In order to remove the motor 146, the upper bearing and its bracket may first be removed. The jack nut 162 is manipulated, as for example through the inlet opening 174. Thereupon, the entire rotor with the baffle ring 184 and fan 172 can bbe bodily removed through the stator bore. The frame 148 may also be removed. Access is then provided for the bearing structures 100 and 88. However, the mere removal of the motor structure does not in any way disrupt the mounting of the gears 84 and 78. Hence, motor parts may readily be replaced or repaired.

The baffle section 184 is mounted for rotation with the shaft 156 is order to provide a sufficiently large aperture in the coil bracket 164 for passage of the fan 172 and without disturbing the fittings for the lubricant system.

The motor and gear mechanism as described can be installed as a unit in the same manner as a conventional motor. However, each component of the unit is readily accessible for repair or replacement. Yet only a minimum number of additional parts are required.

The inventors claim:

1. In a power unit for a vertical shaft: a casing adapted to be installed about said shaft; a low-speed driven shaft supported by the casing and having provisions for connection to said vertical shaft; a high-speed driving shaft supported for rotation about an axis parallel to said low-speed shaft; gear members carried by the shafts and forming a gear reduction mechanism between the shafts; and a motor element detachably secured to said casing above said high-speed driving shaft and directly coupled to said high-speed shaft whereby said motor element may be installed as a unit with said casing at the pump head.

2. The power unit as set forth in claim 1 together with a pair of bearing members for the gear member of the high-speed shaft, and mounted by said casing on opposite sides of said gear member; said motor having a rotor provided with a shaft detachably connected at its lower end to said high-speed shaft; said bearing members serving as the bearing means for the lower end of said rotor.

3. The power unit as set forth in claim 2 in which said rotor shaft and said high-speed shaft have companion parts movable into wedging engagement to align the rotor shaft with said high-speed shaft and for transmission of rotary power therebetween.

4. The power unit as set forth in claim 3 together with a jack nut between the rotor shaft and said high-speed shaft for separating said shafts.

5. In a power unit for a vertical shaft having a threaded upper end: a casing; a pair of vertically spaced bearing structures mounted on the casing; a hollow shaft supported by said bearing structures, and adapted to be telescoped over said vertical shaft; a nut mounted on said threaded upper end of said vertical shaft, and suported on the upper bearing structure; coupling means for transmitting rotary motion from the hollow shaft to said vertical shaft; a high-speed shaft supported for rotation about an axis parallel to said hollow shaft; gear members carried by said high-speed shaft and said hollow shaft forming a gear reduction mechanism therebetween; and a motor element detachably secured to said casing above said high-speed driving shaft and laterally offset from said hollow shaft whereby the said nut is accessible for manipulation without disturbing said motor.

6. The power unit as set forth in claim 5 in which said coupling means includes parts separable upon upward movement of said vertical shaft.

7. The power unit as set forth in claim 6 in which said parts comprise a series of screws on one part having heads engaging the ends of apertures formed in the other part.

8. The power unit as set forth in claim 5 in which said hollow shaft is confined against vertical movement to maintain said bearing structures seated.

9. The power unit as set forth in claim 6 in which said hollow shaft is confined against vertical movement to maintain said bearing structures seated.

10. The power unit as set forth in claim 7 in which said hollow shaft is confined against vertical movement to maintain said bearing structures seated.

11. In a power unit for a vertical shaft: a casing adapted to be installed above said shaft; a low-speed driven shaft; a first pair of bearings carried by the casing and supporting the low-speed driven shaft; a high-speed driving shaft section; a second pair of bearings carried by the casing and supporting the high-speed shaft section in spaced parallel relationship to said driven shaft; a detachable bearing bracket carried at an aperture of the casing for the upper bearing of said second pair; a pair of gear members carried by said shaft and shaft section and forming a reduction mechanism therebetween; the lower bearing of said second pair and said gear member carried by said high-speed shaft section being removable from said casing through said casing aperture; a motor element detachably secured to said casing above said high-speed shaft section and having a shaft section directly coupled to said high-speed shaft, said second pair of bearings serving to support the motor shaft section; said casing having wall means forming a lubricant reservoir submerging the lower bearing members of said pairs of bearings; a lubricant pump detachably secured beneath said wall means substantially in alignment with said high-speed shaft section; said pump having a shaft detachably connected to the lower end of said high-speed shaft section; conduit means supplied by said pump for delivering lubricant to the upper bearings of said pairs of bearings.

12. The power unit as set forth in claim 11 together with a slinger cup secured to said high-speed shaft section surrounding the upper bearing of said second pair of bearings, and operative to retain lubricant for use by said upper bearing of said second pair upon starting.

13. The power unit as set forth in claim 11 together with retainer means for the upper bearing of said first pair of bearings for determining a level of lubricant therefor.

14. The power unit as set forth in claim 12 together with retainer means for the upper bearing of said first pair of bearings for determining a level of lubricant therefor.

15. The power unit as set forth in claim 13 together with an overflow tube for said upper bearing of said first pair for discharging lubricant back to said reservoir; said gear member of said driven shaft having groove means in its upper face aligned with said discharge tube for trapping lubricant therein for use by said gear members upon starting.

16. The power unit as set forth in claim 14 together with an overflow tube for said upper bearing of said first pair for discharging lubricant back to said reservoir; said gear member of said driven shaft having groove means in its upper face aligned with said discharge tube for trapping lubricant therein for use by said gear members upon starting.

17. The power unit as set forth in claim 13 in which said conduit means opens into a vertical bore of said casing, said tube extending upwardly with clearance into said bore for partially diverting flow of lubricant to said upper bearing of said first pair of bearings.

18. The power unit as set forth in claim 14 in which said conduit means opens into a vertical bore of said casing, said tube extending upwardly with clearance into said bore for partially diverting flow of lubricant to said upper bearing of said first pair of bearings.

19. The power unit as set forth in claim 15 in which said conduit means opens into a vertical bore of said casing, said tube extending upwardly with clearance into said bore for partially diverting flow of lubricant to said upper bearing of said first pair of bearings.

20. The power unit as set forth in claim 16 in which said conduit means opens into a vertical bore of said casing, said tube extending upwardly with clearance into said bore for partially diverting flow of lubricant to said upper bearing of said first pair of bearings.

21. The power unit as set forth in claim 11 together with a nozzle supplied by said pump for depositing lubricant on the gear member carried by said high-speed shaft.

22. The power unit as set forth in claim 12 together with a nozzle supplied by said pump for depositing lubricant on the gear member carried by said high-speed shaft.

23. The power unit as set forth in claim 13 together with a nozzle supplied by said pump for depositing lubricant on the gear member carried by said high-speed shaft.

24. The power unit as set forth in claim 14 together with a nozzle supplied by said pump for depositing lubricant on the gear member carried by said high-speed shaft.

25. The power unit as set forth in claim 15 together with a nozzle supplied by said pump for depositing lubricant on the gear member carried by said high-speed shaft.

26. The power unit as set forth in claim 16 together with a nozzle supplied by said pump for depositing lubricant on the gear member carried by said high-speed shaft.

27. The power unit as set forth in claim 17 together with a nozzle supplied by said pump for depositing lubricant on the gear member carried by said high-speed shaft.

28. The power unit as set forth in claim 18 together with a nozzle supplied by said pump for depositing lubricant on the gear member carried by said high-speed shaft.

29. The power unit as set forth in claim 19 together with a nozzle supplied by said pump for depositing lubricant on the gear member carried by said high-speed shaft.

30. The power unit as set forth in claim 20 together with a nozzle supplied by said pump for depositing lubricant on the gear member carried by said high-speed shaft.

31. In a power unit for a vertical shaft: a casing adapted to be installed above said shaft; a low-speed driven shaft; a first pair of bearings carried by the casing and supporting the low-speed driven shaft; a high-speed driving shaft section; a second pair of bearings carried by the casing and supporting the high-speed shaft section in spaced parallel relationship to said driven shaft; a detachable bearing bracket carried at an aperture of the casing for the upper bearing of said second pair; a pair of gear members carried by said shaft and shaft section and forming a reduction mechanism therebetween; the lower bearing of said second pair and said gear member carried by said high-speed shaft section being removable from said casing through said casing aperture; a motor detachably secured to said casing above said high-speed shaft section and having a shaft section directly coupled to said high-speed shaft, said second pair of bearings serving to support the motor shaft section; said casing having wall means forming a lubricant reservoir submerging the lower bearing members of said pairs of bearings; a lubricant pump; conduit means supplied by said pump for delivering lubricant to the upper bearings of said pairs of bearings; a cooling coil connected to said pump and discharging back to said reservoir, said cooling coil extending circularly above said casing aperture and beneath said motor, said coil having an internal diameter adequate to permit passage of said second pair of bearings and the said gear member carried by said high-speed shaft section.

32. The power unit as set forth in claim 31 together with a fan carried by one of said shaft sections for causing flow of air through said cooling coil, and removable through said cooling coil.

33. The power unit as set forth in claim 31 together with a rotary baffle carried by said motor shaft section for conducting air from said fan to the interior of said motor.

34. In a power unit for a vertical shaft: a casing adapted to be installed above said shaft; a low-speed driven shaft; a first pair of bearings carried by the casing and supporting the low-speed driven shaft; a high-speed driving shaft section; a second pair of bearings carried by the casing and supporting the high-speed shaft section in spaced parallel relationship to said driven shaft; a detachable bearing bracket carried at an aperture of the casing for the upper bearing of said second pair; a pair of gear members carried by said shaft and shaft section and forming a reduction mechanism therebetween; the lower bearing of said second pair and said gear member carried by said high-speed shaft section being removable from said casing through said casing aperture; a motor having a frame, a rotor, a rotor shaft section and stator windings; an adapter mounted on said casing about said aperture, and having wall means provided with an opening and defining a lower air intake section and an upper air exhaust section communicating via said opening; said motor frame extending above said adapter; said casing forming a lubricant reservoir submerging the lower bearing members of said pairs of bearings; a lubricant pump; conduit means supplied by said pump for delivering lubricant to the upper bearings of said pairs of bearings; a circularly extending cooling coil connected to said pump and discharging back to said reservoir; a bracket carried by said adapter and suspending said cooling coil in the lower part of said upper air exhaust section immediately above the opening of said wall means and positioned in the path of air from opening; a fan carried by one of said shaft sections and located at said opening of said wall means for creating a current of air from the lower air intake section of said adapter to the upper air exhaust section of said adapter; and a rotary baffle ring carried by said rotor shaft section, and having ports to admit air passing axially through said coil to said rotor; said bracket having a configuration to cooperate with said rotary baffle to define a path of air past said stator windings and outwardly of said upper part of said exhaust section; said path of air being parallel to that through said cooling coil; said rotor having fan means for inducing a current of air through said path.

35. The power unit as set forth in claim 34 in which said fan is upwardly removable through said cooling coil.

36. The power unit as set forth in claim 35 in which said motor has a stator, the bore of which is sufficiently large to permit passage of said fan and said baffle ring.

37. The power unit as set forth in claim 34 in which said motor has an upper bearing, the said second pair of bearings serving to support the lower end of said motor shaft; a detachable connection between said motor shaft section and said high-speed shaft section comprising wedging parts at the adjacent ends of said shaft sections; and a jack nut mounted on one of the sections for separating said shaft sections.

38. The power unit as set forth in claim 35 in which said motor has an upper bearing, the said second pair of bearings serving to support the lower end of said motor shaft; a detachable connection between said motor shaft section and said high-speed shaft section comprising wedging parts at the adjacent ends of said shaft sections; and a jack nut mounted on one of the sections for separating said shaft sections.

39. The power unit as set forth in claim 36 in which said motor has an upper bearing, the said second pair of bearings serving to support the lower end of said motor shaft; a detachable connection between said motor shaft section and said high-speed shaft section comprising wedging parts at the adjacent ends of said shaft sections; and a jack nut mounted on one of the sections for separating said shaft sections.

40. In a power unit for rotating a load shaft: a casing; a low-speed shaft and a high-speed shaft supported by the casing; said low-speed shaft having provisions for connection to said load shaft; gear members connecting the high-speed shaft and the low-speed shaft; a motor mounted on said casing and having a shaft; a plurality of bearings for said high-speed and low-speed shafts as well as for said motor; means forming a lubricant reservoir in the casing; a lubricant pump connected to one of said shafts; conduit means for delivering from said pump, lubricant to some of said bearings; a heat exchanger supplied by said pump; and a fan carried by the motor shaft for circulating cooling air through said heat exchanger.

41. In combination: a drive unit; a transmission unit; said units each having a frame; means detachably securing said frames together; a composite shaft interconnecting said units; said composite shaft having a drive component and a transmission component; means forming an axially separable rigid coupling between said shaft components, including a tapered socket formed on one of said shaft components and a correspondingly tapered projection formed on the other of said shaft components wedged in said socket; and a pair of bearings for said composite shaft respectively carried by the frames of said units, said socket projection being located between said bearings.

References Cited
UNITED STATES PATENTS

| | | | |
|---|---|---|---|
| 1,610,726 | 12/1926 | Arutunoff | 310—157 X |
| 1,745,547 | 2/1930 | Layne | 310—157 X |
| 2,139,379 | 12/1938 | Myers | 310—157 |
| 2,418,707 | 4/1947 | Groot | 310—90 X |
| 2,556,435 | 6/1951 | Moehrl et al. | 103—87 |
| 3,020,427 | 2/1962 | Wheeler et al. | 310—59 |
| 3,073,176 | 1/1963 | Daugirdas | 310—83 X |

WARREN E. RAY, *Primary Examiner.*

U.S. Cl. X.R.

310—52, 54, 63, 64, 83, 89, 90